(12) United States Patent
Kirihara et al.

(10) Patent No.: US 7,526,779 B2
(45) Date of Patent: Apr. 28, 2009

(54) OPTICAL DISK APPARATUS

(75) Inventors: Sojiro Kirihara, Kawasaki (JP); Seiji Hamaie, Kuala Lumpur (MY); Hideyuki Onuma, Kuala Lumpur (MY)

(73) Assignee: Hitachi-LG Data Storage, Inc., Tokyo (JP)

( * ) Notice: Subject to any disclaimer, the term of this patent is extended or adjusted under 35 U.S.C. 154(b) by 429 days.

(21) Appl. No.: 11/369,241

(22) Filed: Mar. 6, 2006

(65) Prior Publication Data

US 2006/0218564 A1    Sep. 28, 2006

(30) Foreign Application Priority Data

Mar. 28, 2005  (JP)  ............... 2005-091208
Jun. 15, 2005  (JP)  ............... 2005-174924

(51) Int. Cl.
*G11B 17/04* (2006.01)

(52) U.S. Cl. ...................................................... 720/603

(58) Field of Classification Search ................. 720/603, 720/738
See application file for complete search history.

(56) References Cited

U.S. PATENT DOCUMENTS 6,009,060 A * 12/1999 Kim .......................... 720/603
2004/0081056 A1* 4/2004 Huang et al. ............... 369/75.2
2004/0133900 A1 7/2004 Cho et al.
2006/0112405 A1 5/2006 Okazawa et al.
2006/0136940 A1* 6/2006 Nishide et al. .............. 720/603
2007/0124742 A1* 5/2007 Makino ...................... 720/603

FOREIGN PATENT DOCUMENTS

| JP | 2002-025240 | 1/2002 |
| JP | 2004-199861 A1 | 7/2004 |
| KR | 10-2004-0054419 A | 6/2004 |
| WO | 2004/034397 A | 4/2004 |

* cited by examiner

*Primary Examiner*—Allen T Cao
(74) *Attorney, Agent, or Firm*—Townsend and Townsend and Crew LLP

(57) ABSTRACT

An optical disk apparatus, enabling to reduce noises, the wind sounds generated due to rotation of a disk, with certainty, irrespective of an increase in rotation speed of the disk, comprises a disk motor 12 for rotating the optical disk 100 loaded into an inside thereof, an optical pickup 15 for recording or reproducing information from or onto the optical disk rotated, and a tray 10 for loading the optical disk therein, wherein the tray has a flat surface 10c, being nearly circular in the shape, on which the optical disk is disposed, and a peripheral portion 10d formed surrounding a periphery thereof, and the peripheral portion is nearly equal to an upper surface of the optical disk, and further a distance from a tip portion of the optical disk to be loaded within the apparatus is equal to 1.8 mm or larger than that and equal to 4.0 mm or smaller than that, in particular, preferably it is equal to 2.0 mm or larger and equal to 2.7 mm or smaller.

3 Claims, 9 Drawing Sheets

| | FREQUENCIES [Hz] 5400 r/min | | | | |
|---|---|---|---|---|---|
| | 500 | 1000 | 2000 | 4000 | 8000 |
| RATIO TO CONVENTIONAL ART | -0.9 | -0.7 | -0.9 | -2.9 | -3.7 |

Unit: dB

| R61.5 (PRESENT) | RESULT OF DRIVE STRENGTH TEST |
|---|---|
| R61.65 | OK |
| R61.8 | OK |
| R61.95 | OK |
| R62.1 | OK |
| R62.25 | OK |
| R62.4 | OK |
| R62.55 | OK |
| R62.7 | OK |
| R62.85 | NG |
| R63 | NG |

OPTICAL DISK APPARATUS

BACKGROUND OF THE INVENTION

The present invention relates to an optical disk apparatus for recording/reproducing information onto/from an optical disk, and in particular, it relates to an optical disk apparatus having the structures being suitable for reducing noises accompanying rotation of the disk at high speed.

For example, an optical disk apparatus for recording and/or reproducing data onto/from an optical disk, being a disk-like optical information recording medium, such as, a CD or DVD, etc., is widely applied to be a data recording/reproducing apparatus for data of digital audio and/or digital moving picture, or an internal or external memory device of a personal computer, for example, because of the distinctive characteristics thereof, i.e., being non-contact, having a large capacity and being low of a cost thereof, and enabling data access at high speed.

With such the optical disk apparatus for performing the recording/reproducing onto/from the CD-ROM and DVD, in particular in the recent years, it is in a tendency of increasing the memory capacity thereof, more and more, accompanying the development made upon technologies for recoding/reproducing the optical disk. For that reason, requirement is also made upon the optical disk apparatus having disk rotation speed, being faster much more. In more details thereof, at present are already available on the market the followings; i.e., having a ten-speed (10×) (2,200 rpm), a twenty-speed (20×) (4,400 rpm), and further a twenty-four-speed (24×) (5,400 rpm), for example, comparing to the standard rotation speed (220 rpm) of the initial optical disk apparatus. And, further more recently, that having a forty-speed is on the development thereof.

By the way, accompanying an increase of the rotation speed of the disk, as was mentioned above, wind sounds generated when the disk rotates (i.e., noises when the disk cuts an air around) comes to be large, and this is the main factor for a source of generating noises. However, conventionally, for the purpose of reducing the noises of the wind sounds due to the rotation speed of the disk mentioned above, it is already proposed to form a portion(s) (i.e., a step-like portion(s)) on a drawer frame (i.e., a tray), being restricted in the height from a flat portion thereof, to be equal or lower than that nearly equal to the upper surface of the disk, which is disposed on a predetermined position in the circular area or region, in the following Patent Document 1, for example.

Also, with the following Patent Document 2, for example, there is already proposed the structures of enlarging the distance from a center of a spindle up to a frond-end sidewall of the said tray, to be larger than a predetermined value (2.75 mm), in the tray of the optical disk reproducing apparatus, for the purpose of preventing flatter, which exerts ill influences upon the recording/reproducing when the disk rotates at high speed.

Japanese Patent Laying-Open No. 2002-25240 (2002); and
Japanese Patent Laying-Open No. 2004-199861 (2004).

However, according to the optical disk apparatus, relating to the conventional arts, in particular, the former thereof, though forming the step-like portion on the periphery of the drawer frame, there are still caused flows of air having a large flow velocity, within a gap defined between an upper end surface portion of step-like portion and the tip portion of the disk rotating at high speed, and therefore it is impossible to obtain an effect of fully reducing the noises, necessarily. Also, further in a case when forming the step-like portion on the periphery of the drawer frame, there is a drawback that this deteriorates a loading property, in particular, when loading the optical disk at the central portion thereof. Thus, with such the step(s), the optical disk to be loaded is caught thereon, on the way of the loading, or in a case when forming the step-like portion, approximately covering all over the periphery portion, it is difficult for the optical disk to be guided to the predetermined position, even if forming a fragment of a stopper, for example. Furthermore, although the drawer frame having such step-like portion is made through a molding process of resin, ordinarily, however there can be also pointed out the following drawbacks; i.e., a die for that comes to be complex, a working process increases the number thereof, and it results into a reason of increasing the costs of the apparatus as a whole. Also, within the optical disk reproducing apparatus relating to the conventional arts, in particular, the latter thereof, no consideration is made on the structures for reducing the noises therein, and for that reason, it never discloses anything of the detailed structure for that purpose therein.

BRIEF SUMMARY OF THE INVENTION

Then, according to the present invention, achieved by taking the drawbacks in the above-mentioned conventional arts into the consideration thereof, an object thereof is to provided an optical disk apparatus, enabling to reduce the noises of the wind sounds generated due to the rotation of the disk, with much more certainty, irrespective of the tendency of an increase in the rotation speed of the disk in recent years, and also being applicable into an actual product thereof, easily.

For accomplishing the object mentioned above, according to the present invention, first of all there is provided an optical disk apparatus, comprising: means for rotating an optical disk loaded into an inside thereof; means for recording or reproducing information from or onto said optical disk loaded; and a tray for loading said optical disk into the inside of said apparatus, wherein said tray has a flat region, being formed to be nearly circular, for positioning the optical disk thereon, and a peripheral portion, being formed to rise surrounding a periphery of said circular region, and said peripheral portion has height being equal to that of an upper surface of the optical disk, and distance from a tip portion of the optical disk loaded into said apparatus is equal to 1.8 mm or more and equal to 2.7 mm or less than that in a part thereof.

Further, according to the present invention, in the optical disk apparatus as described in the above, preferably said periphery portion has the distance from the tip portion of the optical disk loaded into said apparatus, being equal to 1.8 mm or more and equal to 2.7 mm or less than that all around the periphery thereof, and further, preferably, said periphery portion has the distance from the tip portion of the optical disk loaded into said apparatus, being equal to 2.0 mm or more and equal to 2.7 mm or less than that.

As was mentioned above, according to the present invention, there can be achieved the effect of enabling to reduce the noises of the wind sounds generated due to the rotation of the disk, with much more certainty, but through a simple structure thereof, and therefore being applicable into an actual product thereof, easily.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE INVENTION

Hereinafter, embodiments according to the present invention will be fully explained by referring to the attached drawings.

Figure 1:
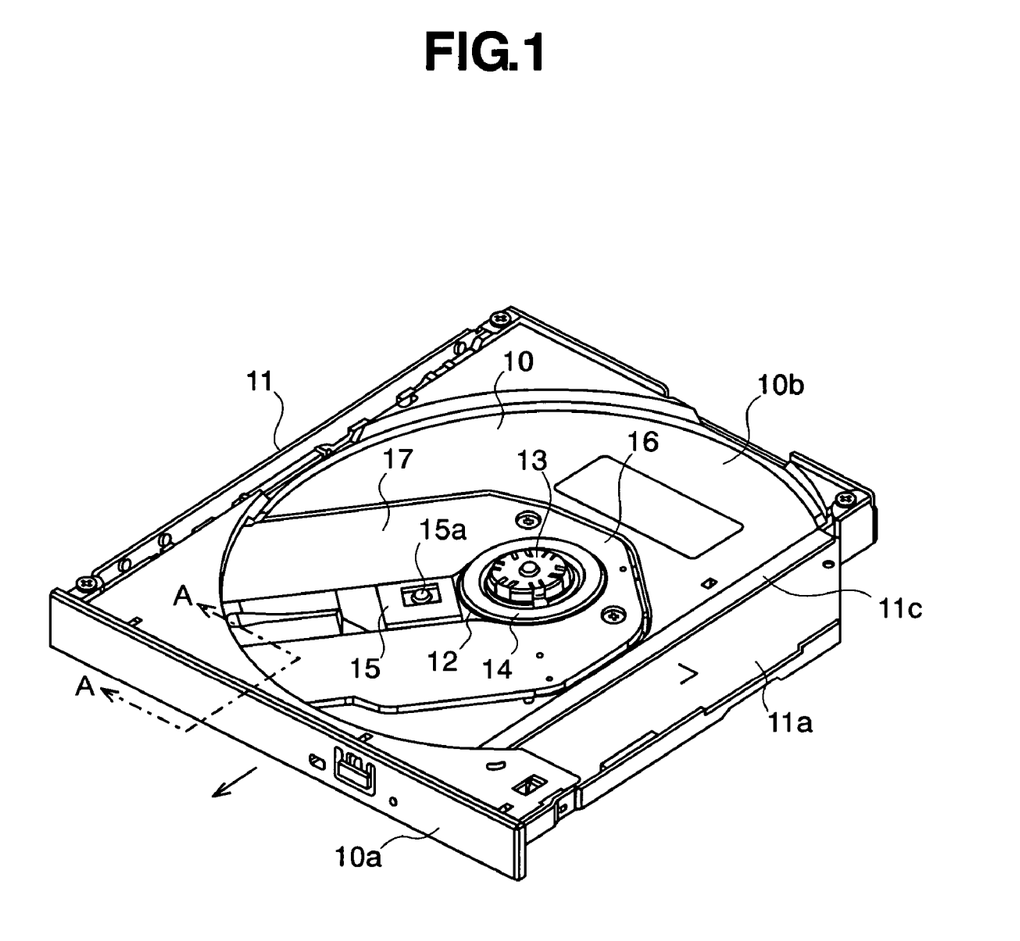
FIG. 1 is a perspective view for showing the outlook structures of an optical disk apparatus, according to an embodiment of the present invention.

FIG. 1 shows an optical disk apparatus according to the present invention, under the condition that a tray thereof is inserted into an inside of a housing (i.e., a case member) 11, and in this figure, in particular, under the condition that an upside case member (not shown in the figure) of the housing 11 is taken out, for the purpose of showing the detailed structures of an inside thereof. Further, this tray 10 is a member for carrying an optical disk, having a diameter of 120 mm, for example, into the inside of the apparatus, or into an outside of the apparatus from the inside thereof, within the optical disk apparatus.

In this FIG. 1, at around the central portion of the housing (i.e., a bottom case member) 11 of a thin type, having a plate-like rectangular outer shape (being about 10 mm in thickness thereof), i.e., being so-called by "slim", there is provided a disk motor for driving an optical disk (not shown in the figure), rotationally, and at an upper end of a rotation shaft of that disk motor is attached a clamper portion 13 to be inserted into a central bore of the said disk, as a disk chucking means, for supporting the disk in radial directions thereof, in the condition when the optical disk is loaded within the apparatus. Further, a reference numeral 14 in the figure depicts a flat disk-supporting portion, being concentric with the clamper portion mentioned above, which is disposed above the above-mentioned disk motor, and this supporting portion supports the said optical disk on a plane portion thereof under the condition where the damper portion 1 mentioned above is inserted into the central bore of the optical disk.

Also, within the housing (the case member) 11 is installed an optical pickup 15 for recording data thereto or for reading out data recorded thereon, through irradiating laser onto said optical disk loaded, in a freely movable manner into the radial direction of the optical disk through a mechanism, but not shown in the figure herein. This optical pickup 15 comprises an objection lens 15a within an inside thereof. Also, a reference 16 in the figure depicts a unit mechanism portion, which comprises a moving mechanism (not shown in the figure) for moving the optical pickup 15 into the radial direction of the disk within an inside thereof, including the disk motor 12 mentioned above therein, and it also shifts the position thereof (i.e., the height) elevating up and down, after supporting the optical disk on a disk-surface supporting portion 14, which is inserted into the inside thereof while loading on the tray mentioned above. Also, the reference numeral 17 in the figure depicts a cover member of the unit mechanism, which is provided for covering over a surface of the unit mechanism 16 mentioned above, except for the damper portion 13, the disk-surface supporting member 14 and the optical pickup 15.

Further, the housing (the case member) 11 comprises a wing portion shown by a reference numeral 11a in the figure, and a reference numeral 11c depicts a flexible sheet-like member, which is provided at an end portion of the wing portion 11a mentioned above (i.e., on a side of the tray 10).

To the housing (the case member) 11 having such the structures moves the tray 10 mentioned above, as is shown by an arrow in the figure; i.e., for carrying the optical disk into an inside of the apparatus or into an outside thereof from that inside. Further, a reference numeral 10a in the figure depicts a front panel, which is formed on a front side surface of the tray in one body. Accompanying the moving operation of this tray 10, the unit mechanism portion 16 also moves together with it, so that the optical disk mounted on the recess portion 10b of the tray 10 is set at a predetermined position within the optical disk apparatus.

Figure 2:
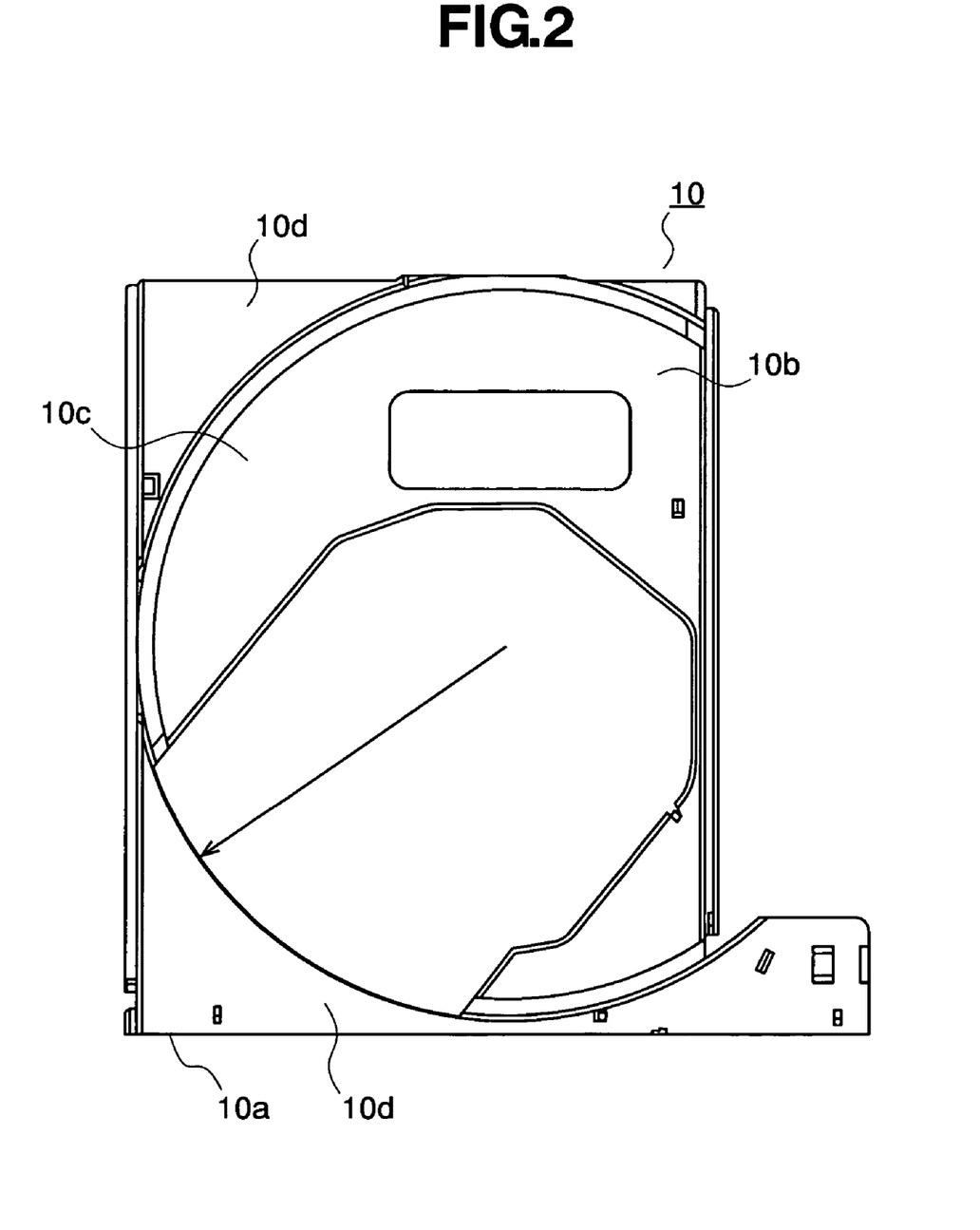
FIG. 2 is an upper view of the optical disk apparatus mentioned above, while taking out a tray therefrom.

Next, FIG. 2 attached herewith shows the tray 10 mentioned above, but under the condition of being taken out from the housing (the case member) 11 and further removing the disk motor 12, the damper portion 13, the disk-surface supporting member 14, the optical pickup 15, the unit mechanism portion 16 and the unit mechanism cover member 17 therefrom. As is apparent from this figure, the tray 10 has an outer configuration of being rectangular, approximately, and plate-like, and it has the recess portion 10b in the central portion thereof, and this recess potion comprises a flat surface 10c having a nearly circular shape (for example, a circle in the degree of ¾), on which the disk is disposed, and a peripheral portion 10d, being formed to rise surrounding the periphery of that flat surface 10c in one body thereof. Further, the tray 10 having such structures as was mentioned above is formed, normally, through the molding process of resin. Also, "R" in the figure depicts the radius of the circular recess portion 10b mentioned above.

Following to the above, by referring to FIGS. 3(a) and 3(b) attached herewith, explanation will be given in more details of the structures of the tray 10 mentioned above, in particular, about the recess portion 10b formed in the central portion thereof, while showing a comparison example in FIGS. 4(a) and 4(b). However, those figures show the condition of being-viewed from the cross-section shown by arrows A-A in the figure, where the optical disk is loaded inside the optical disk apparatus shown in FIG. 1 (i.e., under the condition where the optical disk is chucked on the damper portion 13 of the disk motor 12 mentioned above and the disk-surface supporting portion 14 lifts up). Further in those figures, a reference numeral 11*b* depicts an upside case member, which is not shown in FIG. 1 since it was removed therein, and also a reference numeral 100 depicts the optical disk, which is loaded into the apparatus, to be driven rotationally.

Figure 4A:
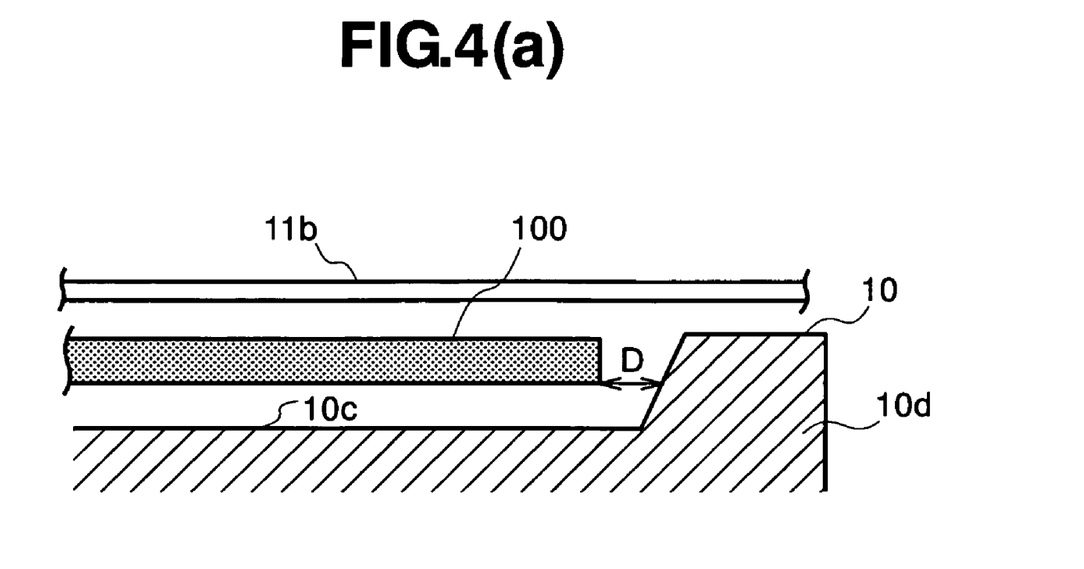
FIGS. 4(a) and 4(b) are views for explaining about the structure of the recess portion of the tray structure, but within the convention optical disk apparatus, as an example of comparison.
Figure 4B:
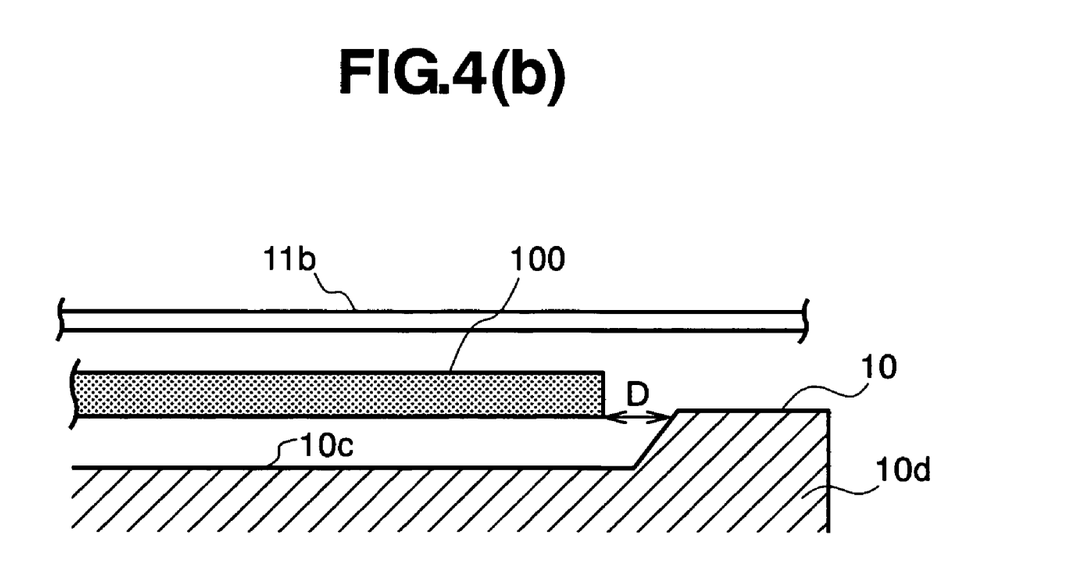

First of all, FIG. 4(*a*) shows a tray 10' having the conventional structures, wherein the distance (or the gap) "D" from a tip portion of the optical disk 100 to the rising peripheral portion 10*d* of the tray 10 is determined to be about 1 mm-1.5 mm, in general. However, with such the conventional structures, because the gap "D" is small, flows of air generated due to the optical disk 10 rotating at high speed come to be large in the flow velocity, in particular, around the wall surface thereof, and this is a cause of generating the noises (i.e., the wind sounds generated due to the rotation of the disk). Further, FIG. 4(*b*) also shows a tray 10" of the conventional structures, too. However, in FIG. 4(*b*), the height of the peripheral portion 10*d* of the tray is restricted to be nearly equal to that of an upper surface of the disk 100. However, the distance (or the gap) "D" is still small to the peripheral portion 10*d* of the tray 10 (i.e., being nearly equal to the case of FIG. 4(*a*)), for that reason, the flows of air generated by the optical disk 100 rotating at high speed come to be large in the flow around the wall surface thereof; therefore, it is impossible to reduce the noises generated (i.e., the wind sounds generated due to the rotation of the disk), fully.

Figure 3A:
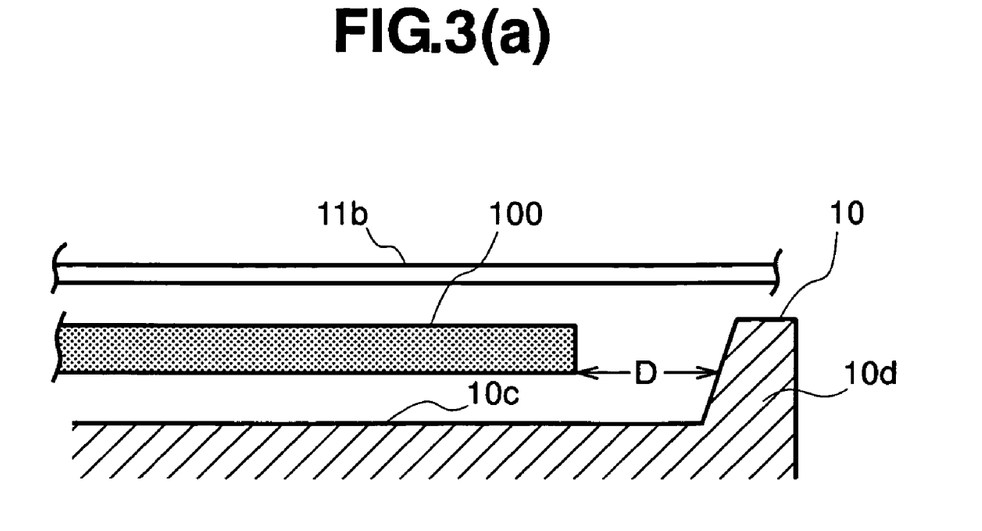
FIGS. 3(a) and 3(b) are views for explaining the structures of the tray within the optical disk apparatus mentioned above, in particular, about that of a recess portion 10b thereof.

On the other hand, FIG. 3(*a*) shows the case of the tray 10 according to the present invention, and as is apparent from the figure, the distance (or the gap) "D" is determined to be large, comparing to that of the conventional structures mentioned above, from the tip portion of the optical disk 100 to the rising peripheral portion 10*d* of the tray 10. Further, the rising peripheral portion 10*d* of the tray 10 is determined at the height nearly equal to an upper surface of the optical disk 100. Thus, with such the structures, the flows of air generated by the optical disk 100 rotating at high speed comes to be small, in particular, the flow velocity on an outer peripheral portion of the disk, because the distance (or the gap) "D" is large, from the outer peripheral portion of the disk 100 up to the peripheral portion 10*d* of the tray 10 (i.e., from the outer periphery of the disk to the wall surface of the tray), and for that reason, the flow velocity comes to be small, therefore it is possible to reduce the noises (i.e., the wind sounds generated due to the rotation of the disk), fully.

Figure 3B:
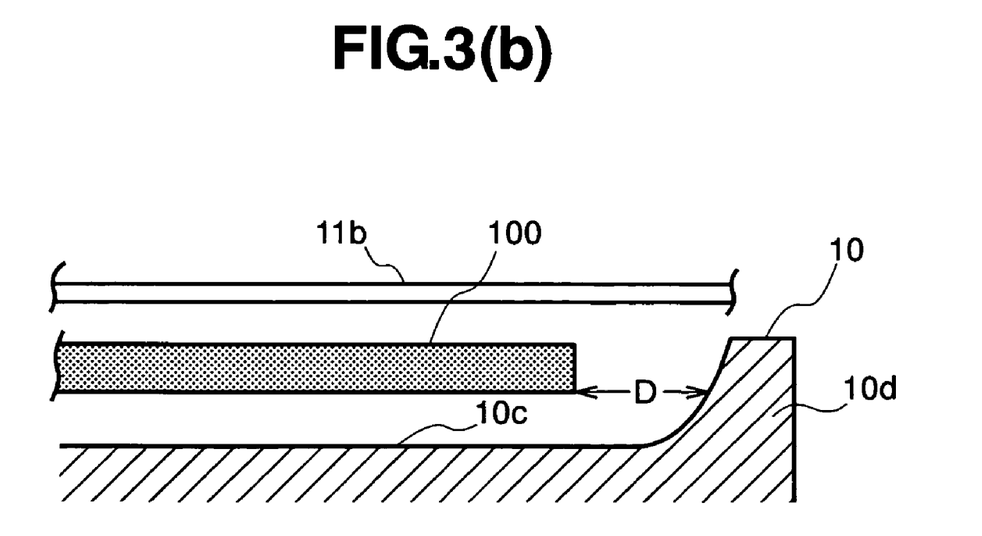

Also, FIG. 3(*b*) shows the structures of the tray 100, according to a variation of the present invention, and as is apparent from the figure, a boundary portion is formed to curve so that the boundary portion changes smoothly between the flat surface 10*c* defining the recess portion 10*b*, being nearly circular in the shape, and the rising peripheral portion 10*d* surrounding it. Further, also in this case, the distance (or the gap) "D" is large from the outer peripheral portion of the disk to the wall surface of the tray, so that the flow velocity comes to be small; therefore, it is possible to reduce the noises (i.e., the wind sounds generated due to the rotation of the disk), fully, and in addition thereto, because the boundary surface between the flat surface 10*c* and the peripheral portion 10*d* is smooth, obtaining an effect of reducing the noises, being large much more, preferably. However, the effect mentioned above is remarkable, in particular, in the optical disk apparatus having a housing of the thin-type, being called by "slim" as was mentioned above, and is also suitable.

Figure 5:
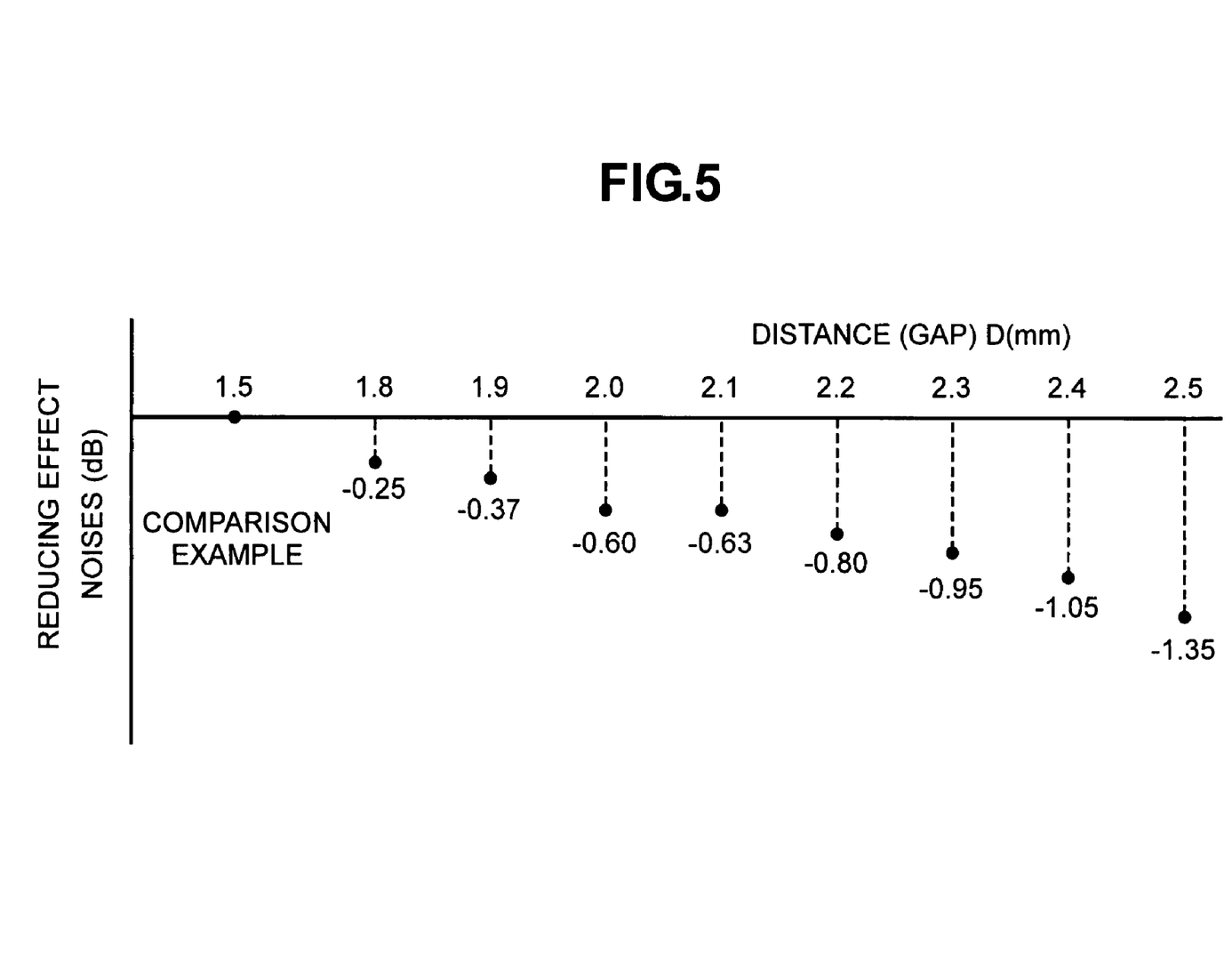
FIG. 5 is a graph for explaining about a relationship between distance (i.e., a gap) D, from an outer periphery portion of the disk to a wall surface of the tray, and the noises measured.

Next, explanation will be made on the effect of reducing the noises, obtained due to such structures as was mentioned above, by referring to a graph shown in FIG. 5; i.e., a relationship between the noises (shown on the vertical axis of the graph by dB) measured and the distance (or the gap) "D" from the outer peripheral portion of the disk to the wall surface of the tray, while changing it variously. However, in the figure, "comparison example" shows that, which can be measured by determining the distance, i.e., D=1.5 mm, in FIG. 4(*a*), for example. And, as is apparent from this graph, it can be seen that the effect of reducing the noises (i.e., the wind sounds generated due to the rotation of the disk) comes to be large, as the distance (or the gap) "D" is made large from the outer peripheral portion of the disk to the wall surface of the tray. And, it can be seen that the reducing effect comes to be large, such as, −0.6 dB in the degree thereof, in particular within a region where D=2.0 mm or more, in other words, that the effect reducing the noises is remarkable or noticeable. Further, the rotation speed of the optical disk at that time is the twenty-four-speed (24×) (5,400 rpm).

Figure 6:
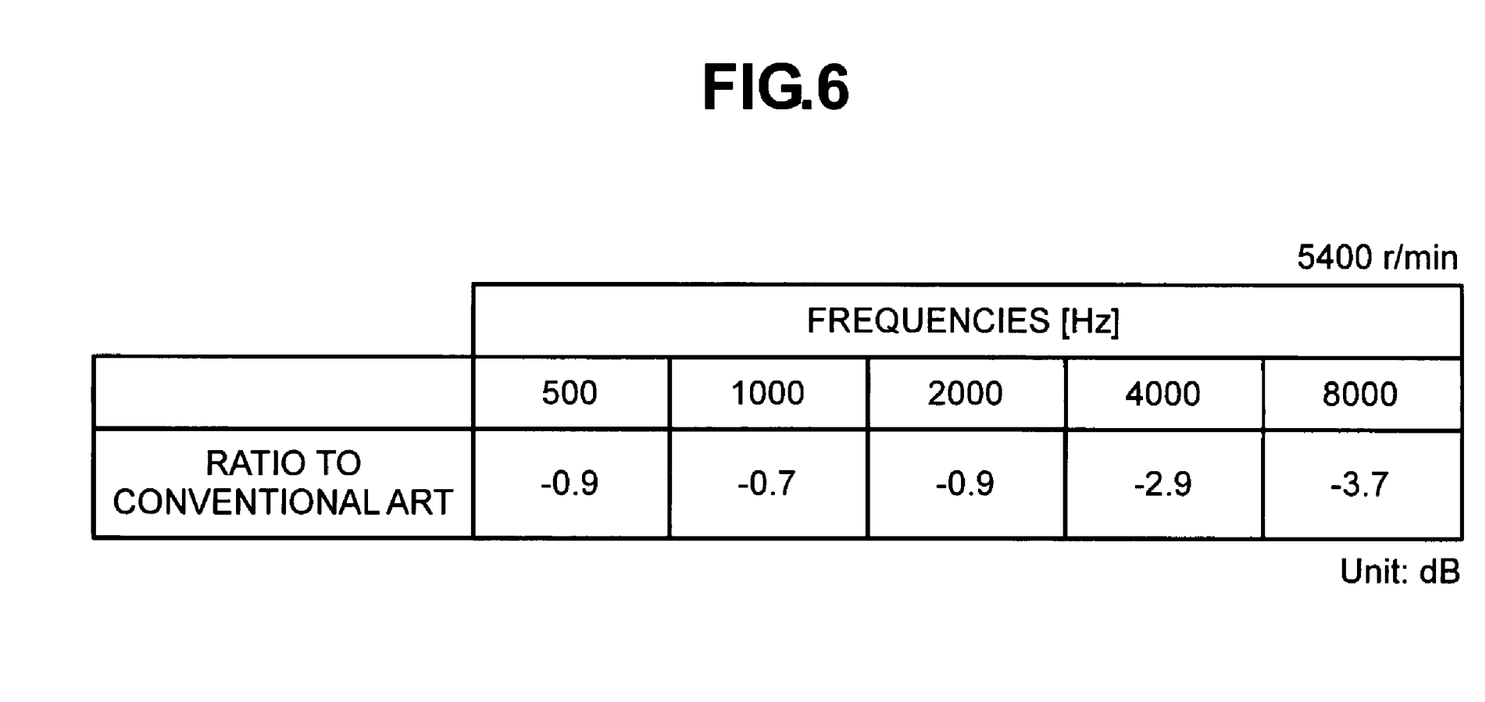
FIG. 6 is a view for showing values of the noises measured, comparing to those of the comparison example, at every frequency thereof.

Also, FIG. 6 attached herewith shows the values measured at respective frequencies (500 Hz, 1,000 Hz, 2,000 Hz, 4,000 Hz, and 8,000 Hz), about the noises measured from the front surface of the optical disk apparatus (i.e., from a side of the front panel in FIG. 1), comparing to those of the comparison example (i.e., "conventional ratio") indicated by a unit "dB", in case of determining D=2.0 mm. Further, the rotation speed of the optical disk at this time is also the twenty-four-speed (24×) (5,400 rpm), as is similar to the above. As apparent from this result, the effect of reducing the noises is remarkable or noticeable with an aid of such structures as was mentioned above, and in particular, within a region of high frequencies, and for that reason, there can be achieved an effect of enabling to remove the noises in a high tone portion, being offensive to ears, in particular.

As was mentioned above, if enlarging the distance (or the gap) "D" from the outer peripheral portion of the disk to the wall surface of the tray, i.e., D=1.8 mm or more, or more preferably, enlarging it to be equal to 2.0 mm or more, in particular, it is possible to reduce the flow velocity of airflows generated around the outer peripheral portion of the optical disk, thereby lowering the noises generated therefrom.

However, the distance (or the gap) "D" must be determined to be at least 4.0 mm or smaller than that, from a viewpoint of the structures of the optical disk apparatus, which will be mentioned below. For example, in case of the optical disk apparatus for use of reproducing the CD, because the distance is about 64 mm from the center of the disk motor up to the front panel 10*a*, then the said front panel 10*a* must be cut off in a portion thereof if determining the distance "D" to be equal to 4.0 mm or smaller than that; therefore, exerting an ill influence upon an external appearance thereof, too. Or, alternatively, there may be generated a possibility that an eject switch cannot be positioned therein. Further, according to two (2) kinds of the destructive strength tests (i.e., the destructive strength test on a single body of the tray, and the destructive strength test on a drive (i.e., the optical disk apparatus) conducted by the inventors, etc., which will be mentioned in details thereof, it can be seen that preferably this distance (or the gap) "D" be 2.7 mm or smaller than that, from a practical viewpoint thereof. Hereinafter, description will be made about those two (2) kinds of destructive strength tests in details thereof.

<Destructive Strength Test on Tray Single Body>

Figures 7A, 7B:
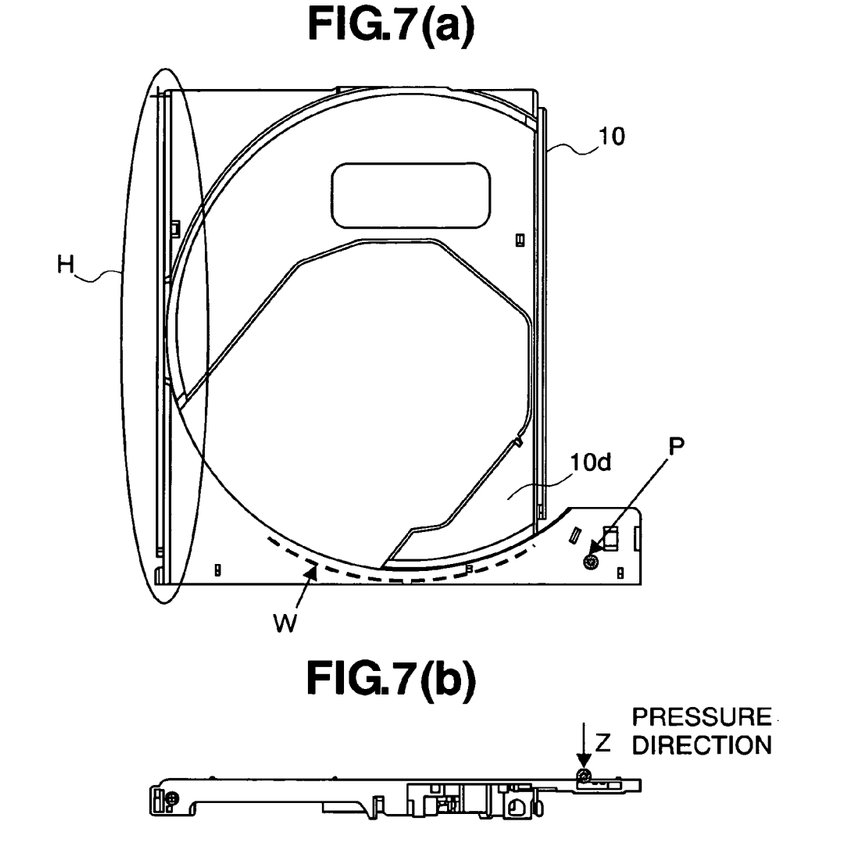
FIGS. 7(a) and 7(b) are views for explaining a method for testing on the destructive strength, in particular, about a single body of the tray, within the optical disk apparatus according to the present invention.

Explanation will be made about the method of the destructive strength test on a tray single body, by referring to FIGS. 7(*a*) and 7(*b*) attached herewith. Namely, in FIG. 7(*a*), while holding a single body of the tray 10 at a portion thereof (i.e., shown by a reference mark "H" in the left-hand side portion of FIG. 7(a)), a force is applied at a position opposite to it (i.e., a portion shown by a mark "P" in the figure) into the direction shown by an arrow "Z" in FIG. 7(b). However, the mark "W" in the figure indicates the position of the wall surface, in case when determining the above-mentioned distance (or the gap) "D" from the outer peripheral portion of the disk to the wall surface of the tray at various kinds of values.

Figure 8:
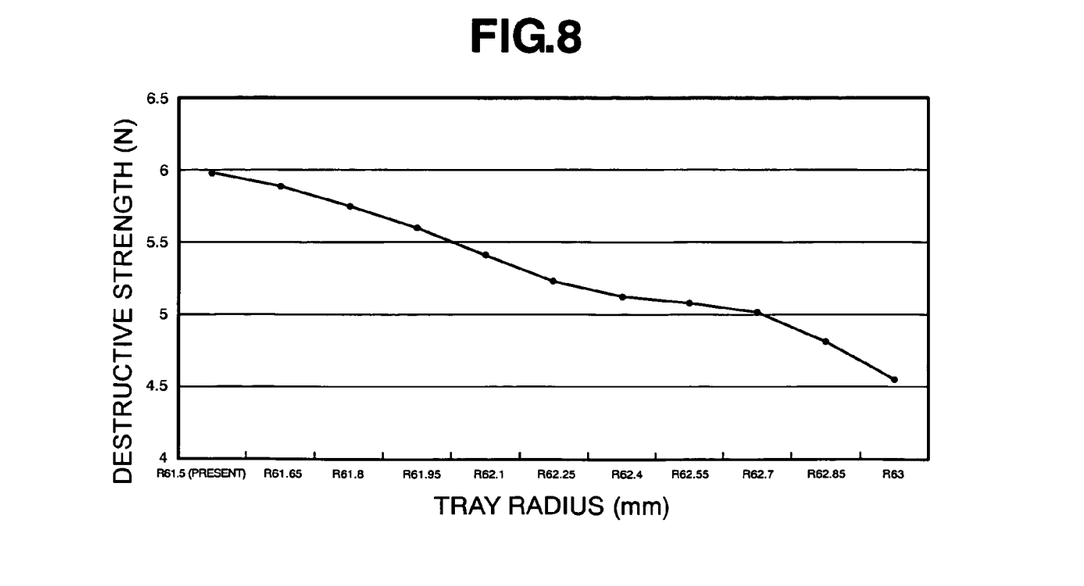
FIG. 8 is a view for showing a relationship between a radius R of the tray and the destructive strength of the tray single body, which are obtained through the test shown in FIGS. 7(a) and 7(b)

The result obtained from the method mentioned above will be shown in FIG. 8. Namely, as apparent from this graph, the tray radium R (=a radius of the flat surface 10c) is changed from the present value, 61.5 mm (i.e., D=1.5 mm) to 63 mm (i.e., D=3.0 mm), gradually. As a result of this, it can be seen that the destructive strength of the tray single body falls down, approximately in proportional to an increase of "D" (i.e., decease in the thickness of the peripheral portion 10d), up to when R=62.7 mm; however, it falls down, abruptly, when exceeding R=62.7 mm (i.e., D=2.7 mm).

<Destructive Strength Test of Drive (Optical Disk Apparatus)>

Figure 9A:
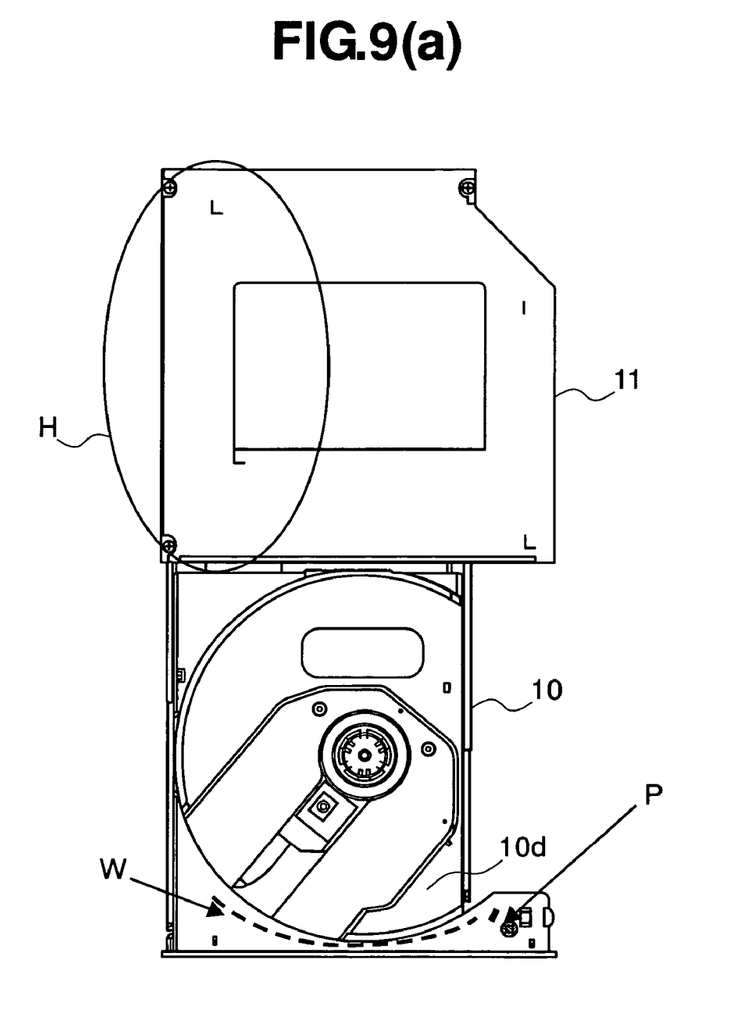
FIGS. 9(a) and 9(b) are views for explaining a method for testing on the destructive strength, in particular, about a drive, within the optical disk apparatus according to the present invention.
Figure 9B:
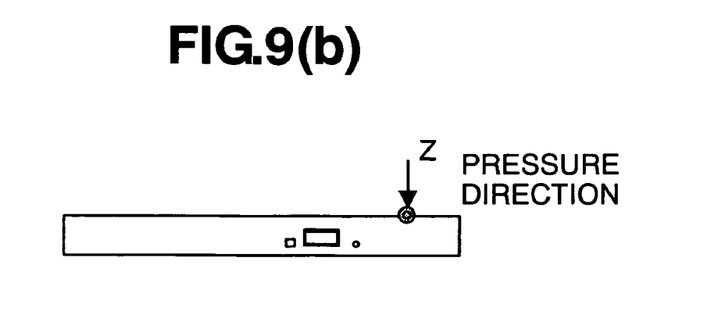

Explanation will be made about the method of the destructive strength test on the tray single body, by referring to FIGS. 9(a) and 9(b). Thus, as is shown in FIG. 9(a), the optical disk apparatus is held, in particular, in a portion of the housing (the case member) 11 thereof (indicated by a mark "H" in FIG. 9(a)), under the condition of discharging the tray 10 therefrom, while a force is applied onto a portion of the tray (at the position shown by a mark "P" in the figure) under the condition of being discharged, into the direction shown by an arrow Z in FIG. 9(b). However, also the mark "W" in the figure indicates the position of the wall surface, in case when determining the above-mentioned distance (or the gap) "D" from the outer peripheral portion of the disk to the wall surface of the tray at various kinds of values.

Figure 10:
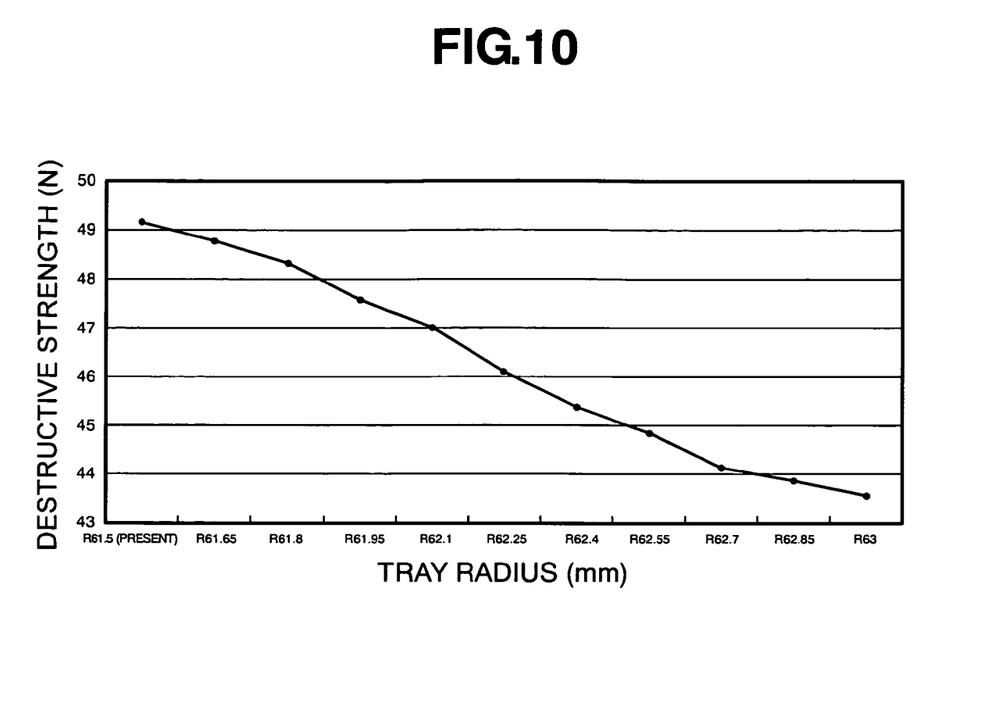
FIG. 10 is a view for showing a relationship between the tray radius R and the destructive strength thereof, which are obtained through the test shown in FIGS. 10(a) and 10(b)

The result obtained from the method mentioned above will be shown in FIG. 10. Namely, as apparent from this graph, the tray radium (=a radius of the flat surface 10c) is changed from the present value, 61.5 mm (i.e., D=1.5 mm) to 63 mm (i.e., D=3.0 mm), gradually. As a result of this, it can be seen that the destructive strength of the tray single body falls down, approximately in proportional to a decrease of "RD" (i.e., decease in the thickness of the peripheral portion 10d). And, when it exceeds R=62.7 mm (i.e., D=2.7 mm), it can be seen that the destructive strength falls down equal to 44N or less than that, which is practically required to the drive, i.e., the optical disk apparatus, undesirably.

Figure 11:
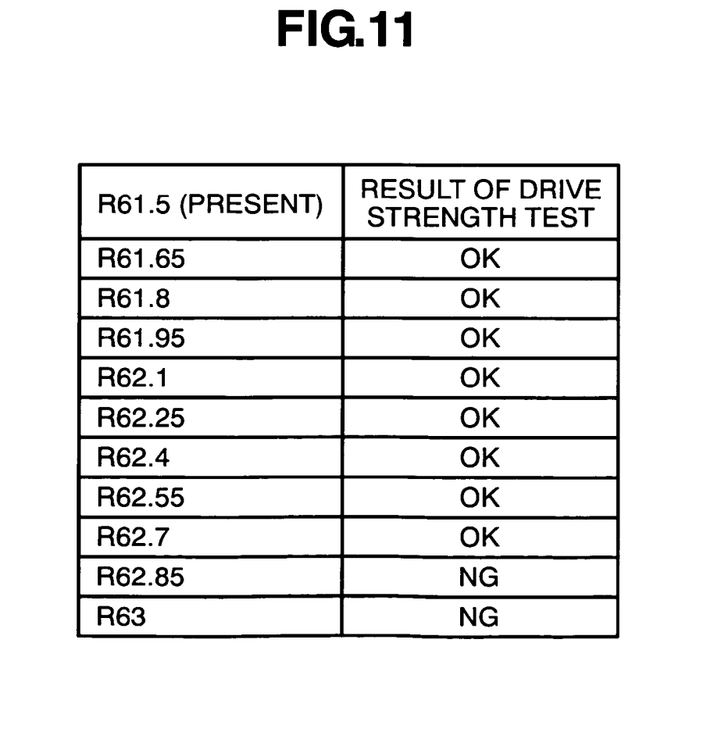
FIG. 11 is a view for showing a result of the destructive strength test, being collected upon basis of the test mentioned above.

A result of collecting the two (2) kinds of the destructive strength tests mentioned above is shown on a table in FIG. 11. Namely, as is apparent from the table, as a result of gradually increasing the tray radius "R" (i.e., the decrease of thickness of the peripheral portion 10d) from the present (=61.5 mm) at a unit 0.15 mm, it can be seen that preferable test results can be obtained on the drive strength up to R=62.7 mm, however the drive strength falls down, undesirably, when the radius exceed that value.

Further, in the embodiment mentioned above, the explanation was given about the case where the distance (i.e., the gap) "D" from the outer peripheral portion of the disk 100 to the peripheral portion of the tray 10 is enlarged, covering all around the periphery thereof (but, portions where the peripheral portion(s) 10d lie(s)); however, it may be also apparent that, the present invention should not be restricted thereto, and that the similar effect can be also obtained by enlarging the distance (i.e., the gap) "D" in a portion of the periphery thereof.

Also, in the embodiment mentioned above, the explanation was given only on the optical disk apparatus, into which the optical disk, being 120 mm in the diameter thereof, is loaded for recording/reproducing thereof; however, it may be apparent that, the present invention should not be restricted only to that, and other than that, the present invention may be applied, in a similar manner, into an optical disk apparatus, into which the optical disk, being 80 mm in the diameter thereof, is loaded for recording/reproducing thereof, for example. Also, within an optical disk apparatus being able to load optical disks having plural kinds of diameters thereof, for recording/reproducing thereof, the distance from the tip portion of the optical disk having the maximum diameter, which can be loaded into the apparatus, may be determined within the extent or region mentioned above.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. An optical disk apparatus, comprising:
    a rotator which rotates an optical disk loaded into an inside thereof;
    a recorder which records or reproduces information from or onto said optical disk loaded; and
    a tray which loads said optical disk into the inside of said apparatus,
    wherein said tray has a flat region, being formed to be nearly circular, for positioning the optical disk thereon, and a peripheral portion, being formed to rise surrounding a periphery of said circular region, and
    wherein, when the optical disk is loaded into the optical disk apparatus,
        an upper surface of the peripheral region is substantially coplanar with an upper surface of the optical disk; and
        an inner surface of the peripheral region and a periphery of the optical disk are separated by a distance of 1.8 mm to 2.7 mm.

2. The optical disk apparatus, as described in the claim 1, wherein the periphery of the optical disk is separated from the inner surface of the peripheral region by a distance of 1.8 mm to 2.7 mm, within an area encompassed by the peripheral region.

3. The optical disk apparatus, as described in the claim 1, wherein the periphery of the optical disk is separated from the inner surface of the peripheral region by a distance of 2.0 mm to 2.7 mm.

* * * * *